P. CATUCCI.
PHONOGRAPH.
APPLICATION FILED APR. 26, 1912.

1,087,106.

Patented Feb. 17, 1914.

P. CATUCCI.
PHONOGRAPH.
APPLICATION FILED APR. 26, 1912.

1,087,106.

Patented Feb. 17, 1914.
8 SHEETS—SHEET 4.

P. CATUCCI.
PHONOGRAPH.
APPLICATION FILED APR. 26, 1912.

1,087,106.

Patented Feb. 17, 1914.
8 SHEETS—SHEET 5.

Witnesses:
Louis Sanders Jr.
Gertrude L. Smith.

Pliny Catucci Inventor
By Attorney
Louis M. Sanders

UNITED STATES PATENT OFFICE.

PLINY CATUCCI, OF NEWARK, NEW JERSEY, ASSIGNOR TO A. F. MEISSELBACH & BROTHER, A CORPORATION OF NEW JERSEY.

PHONOGRAPH.

1,087,106.      Specification of Letters Patent.      Patented Feb. 17, 1914.

Application filed April 26, 1912. Serial No. 693,352.

*To all whom it may concern:*

Be it known that I, PLINY CATUCCI, a citizen of the United States, residing in the city of Newark, county of Essex, and State of New Jersey, have invented certain new and useful Improvements in Phonographs, of which the following is a specification.

My invention relates to phonographs for use in connection with the reproduction of sound by means of records, and has for its object the general improvement of the various details of the phonograph, and is intended broadly to include means for relatively separating the sound box from the record support at a predetermined point or position which in practice is fixed as at the end of the selection upon the record. This separation of sound box and record may be by permitting the record support to rotate at a relatively fixed position and providing means for elevating the sound box and its stylus free from the record, or on the other hand, the sound box itself may be made to occupy a relatively fixed position with the stylus point resting upon the face of the record, with means for withdrawing the record and its support from contact with the stylus and providing such means with additional parts whereby such withdrawal will stop the motor and consequently the rotation of the record support.

Other features of improvement relate particularly to the motor and the means for winding up the motor spring; the turn table and the method of mounting the same, whereby the table itself has a flexible connection with the drive shaft upon which the same is mounted, and important improvement is made in the sound conveyer whereby the sound box may be rotated through an angle of substantially 180 degrees to carry the stylus of the sound box out of and into position for engagement with the record disk; another important feature resides in the sound conveyer, the same being made of telescoping parts with connections whereby the movable telescoping part may be actuated to be lifted through a distance sufficient to carry the stylus of the sound box entirely free from the record, as for example, at the end of the rendition of the selection upon the record; another feature of the invention embodies automatic mechanism whereby at the close of a rendition of a selection, the sound box and its stylus are raised clear from the record and simultaneously the motor is automatically stopped. I also provide a novel form of trap door for the outer end of the sound conveyer, so that the sound waves as they pass from the sound conveyer to the open atmosphere may be damped or muffled to any desired degree.

In the accompanying drawings, Fig. 16 is a detached view in perspective of the operating rock shaft hereinafter referred to. Fig. 17 is a detached perspective view of one end of said shaft. Fig. 18 is a vertical sectional view of a still further modified form of a sound conveyer.

It should be stated at this point that I make no specific claim to the sound box in this application as said sound box forms the subject matter of a co-pending application in which its details are more specifically described and claimed. It is shown in connection with the other parts in this application for the purpose of gaining a clearer understanding of the objects and purposes of the various parts of the phonograph and its method of operation.

Similar reference numerals refer to like parts throughout the specification and drawings.

The case 1 may be of any desired or preferred form, but as shown, it consists of a generally rectangular box in which and upon which are mounted the working parts of the phonograph. As shown the box is covered at the top and open at the bottom in order to make the interior of the structure more readily accessible.

Beneath the cover 2 and suspended from the same, by means of the bolts 3 is the motor, the details of which I will now proceed to describe: The motor consists of the upper plate 4, the lower plate 5 rigidly connected together by means of the bolts 3, the plates 4 and 5 forming the supports for the train of gears and the motor spring. The spring is mounted in the spring box 6 and is of the usual spiral or clock spring type, the inner end of said spring being connected to the spring shaft 7, and its outer end connected to the cylindrical part of the spring box. Mounted upon this shaft 7 and rigidly connected thereto is the main driving gear 8.

The cover 9 of the spring box, when in position is rigidly connected to the spring box itself, and said cover has rigidly connected therewith, the sleeve 10, which latter is mounted upon the upper end of the shaft 7 so that the rotation of the sleeve 10 will cause a rotation of the spring box itself and consequently wind up the spring. The bolts 3 extend through the spacing thimbles 3', rubber gaskets 3², the cover 2, gaskets 3³, and are secured above the cover by the nuts 3⁴. Ordinarily the winding mechanism of motors of this type includes a pawl and ratchet mechanism for preventing the unwinding of the main or driving spring when hand power is applied to the same to wind it up and when such hand power is relieved. Many objections could be set up to this method of winding or preventing the unwinding, among which may be stated that it is noisy, and if the motor is wound while the selection is being played, it may and often does detract from the beauty of the selection; for this reason I have devised the new method and mechanism for winding which consists in rigidly mounting, upon the sleeve 10, a spiral gear 11, locating the same outside of the upper plate 4, and adjacent to said spiral gear I mount the spiral worm 12, the latter being supported in the bearings 13 and having the reduced extension 14 to which the winding crank 14' may be attached for winding up the main spring. The teeth of both of the spiral gear and spiral worm are cut upon an angle of 45 degrees. The location of the spiral gear 11, outside or above the plate 4, permits said plate to receive the end thrust of the gear 11 due to the tendency of the spiral worm 12 to force said gear 11 and the sleeve 10 endwise, toward the spring box. In order to prevent the tension of the main spring, when fully or partially wound, from reversing the rotation of the spiral worm 12, I provide a spiral spring 15 wrapping the same around the body of the spiral worm 12 quite closely, and attaching one end of the same to the upper plate 4, as at 16. The interior of the spiral spring 15 is always in frictional contact with the cylindrical surface of the spiral worm 12, but it will be noted that when the reduced extension 14 or the spiral worm 12 is rotated to wind up the main spring, the frictional contact with the spring 15 will operate to unwind or open up said spring, so as to permit the free rotation of the worm in one direction, that is the direction required for winding up the spring; when however the winding power is removed the tendency of the gear 11 through the influence of the main spring in the spring box will be to reverse the direction of rotation of the spiral worm 12. The slightest reverse rotation of the spiral worm 12 will cause the spring 15 to hug the cylindrical surface of the spiral worm 12 in close frictional engagement, and thereby immediately arrest any tendency to reverse rotation. I regard this as a valuable feature of my invention for the reasons above set forth.

Figure 9:
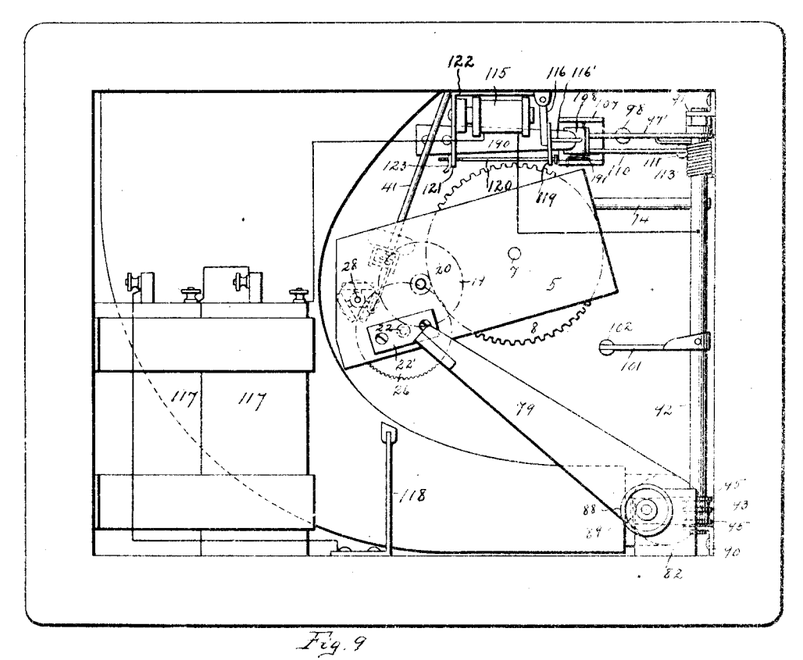
Fig. 9 is a bottom plan view of the structure illustrating the position of the motor and the details of the stop mechanism.
Figure 10:
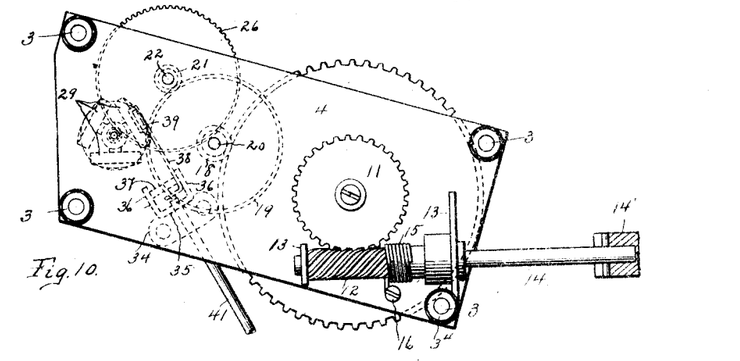
Fig. 10 is a top plan view of the motor showing the details of the winding mechanism and of the hand mechanism for stopping the motor.
Figure 11:
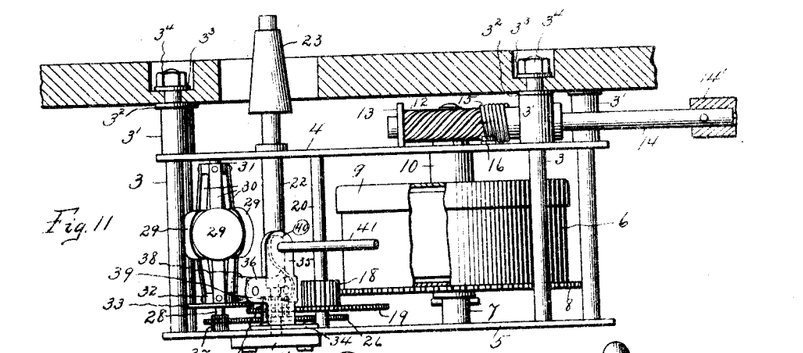
Fig. 11 is a side elevation of the motor disconnected from the case.

The train of gears leading from the main driving gear 8 consists of the spur pinion 18 meshing with the gear 8, the gear 19 rigidly connected to the pinion 18, and both gear and pinion rigidly mounted upon the shaft 20, which latter is provided with reduced pivot bearings supported in the upper and lower plates 4 and 5. Meshing with the gear 19 is the pinion 21 mounted upon the shaft 22, the latter shaft being supported on a fiber bearing 22' on the under side of the lower plate 5 and extending up through the plate 4, and has at its upper end the conical mandrel 23, which latter serves as a support for the rotating table 24, upon which the record 25 is placed. Mounted also upon the lower end of the shaft 21 is the gear 26 which latter engages the pinion 27 of the governor shaft 28. The governor is of the usual type having the three weights 29 mounted upon the flat springs 30, the upper ends of the latter being rigidly connected to the collar 31, as clearly shown in Fig. 10. The lower ends of these flat springs are rigidly connected to a sliding collar 32, which latter has a plate or extension 33 serving as a brake disk. Mounted upon the lower plate 5 is a bracket 34, shown more clearly in its location in Fig. 9. This bracket has an upright portion 35 with forwardly extending apertured lugs 36. In these apertures is mounted a short stub shaft 37, upon which is mounted a bell crank 38, the latter having one arm extending forwardly into the path of the disk 33. The outer end of the arm 38 is provided with any suitable friction material 39 for contact with the upper face of the governor brake disk 33. The other arm 40 of the bell crank extends upwardly and is given a twist as shown in Fig. 10 and it lies just inside of the upright extension 35 of the bracket 34. The upper end 35 of this bracket is provided with a screw threaded aperture into which is screwed the controller shaft 41, the latter extending outside of the case and provided with the knurled turning button 42. In this manner, by screwing the controller shaft or rod 41 in or out, the rate of rotation of the mandrel shaft 22 is controlled within the required limits, inasmuch as the inner end of the controller shaft 41 will limit the oscillation of the bell crank 38. As the control shaft 41 is screwed out, the bell crank 38 is permitted a greater degree of oscillation, and consequently the disk 33 may rise under the influence of the centrifugal action of the balls 29. If however, the control rod or shaft 41 is screwed in, the degree of oscillation of the bell crank is correspondingly limited with a consequent limitation of the governor balls and shaft and with a resultant diminution in the rate of rotation of the mandrel shaft 23.

Figure 5:
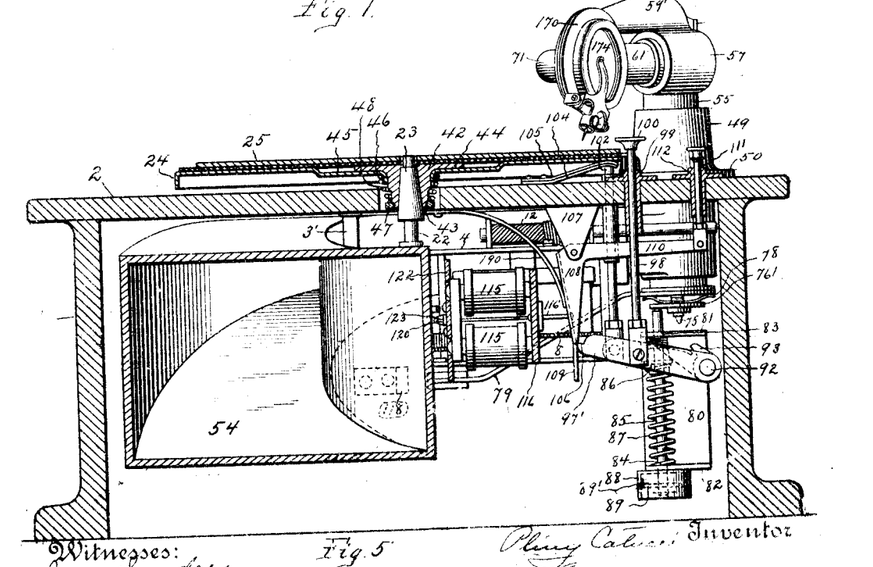
Fig. 5 is a sectional view showing the interior mechanism in the positions occupied by them when the motor is stopped and the sound conveyer elevated.

As above set forth, the mandrel 23 projects above the case cover 2, as shown in Fig. 5, and is made conical to receive the conically apertured mandrel sleeve 42, so that when said sleeve is set upon the conical mandrel 23, they will wedge together and rotate together through their frictional contact with each other. This mandrel sleeve 42 is provided with a screw thread at its lower end, as shown at 43, and a flat laterally projecting flange 44 at its upper end. The rotating table 24 is centrally depressed, as at 45, and provided with a central flanged aperture 46 which fits the exterior surface of the mandrel sleeve 42 and lies against the under side of the flange 44. The nut 47 is screwed upon the lower screw threaded end of the mandrel sleeve 42. Between said nut 47 and the flat under face of the table 24 is located the coil compression spring 48. This structure provides a yielding support for the table 24 and permits the same to yield under compression from the upper side, as from any accidental depression thereof, or even under the influence of the weight of the sound box when the same appears through its stylus upon a record. It is customary in structures of this kind, either to cover the upper face of the table 24 with a layer of felt cemented or glued thereon, or to have a loose disk of felt for the record 25 to rest upon, the purpose, of course, being to serve as friction means for causing the record, through its own weight, to frictionally engage the upper face of the table 24, and rotate freely therewith. It will now be obvious that with the motor spring wound up and the control rod 41 screwed out to a sufficient degree to permit the rotation of the governor shaft 28, the rotating table 24 will be permitted to rotate with any degree of speed within the limits of the mechanism and if a record, as 25, be located upon the table, such record will be caused to rotate with that same degree of speed.

As a means for supporting the sound box and for conveying the sound vibrations from the record, I provide the following mechanism: Mounted upon the cover 2 of the case adjacent to the periphery of the table 24, is the tubular standard 49 flanged as at 50 to rest upon the upper face of the case and projecting through the aperture 51 in the cover 2, to a point considerably below the cover. The lower end of this tubular standard is open and it also has a lateral opening, as at 52, with which latter opening is connected the horn 53 which latter is curved around and opens out to the front of the case as at 54. Extending vertically through the tubular standard 49 is the tube 55, which latter is provided with a lateral opening 56 to register with the lateral opening 52 of the standard 49. The upper end of the tube is provided with a casting 57 having the cross aperture 58 and the vertical aperture 59 therein, which latter opens into the interior of the tube 55, as clearly shown in Fig. 6. This casting is provided with the overhanging arm 59' extending substantially parallel to the lateral aperture 58 therein, and terminating in the apertured supporting end 60, the aperture thereof being in alinement with the aperture 58. Extending into the aperture 58 is the tube 61 loosely mounted therein and capable of rotation. The outer end of the tube 61 is closed with a flanged plug 62, the inner face of which is curved, as shown at 63, so as to make a curved passage around through the tube 61 into the tube 55 by way of a registering aperture 64 in the side of the tube 61. The outer end of the plug 62 is flanged, as shown at 65, and said plug 62 is rigidly fixed in the end of the tube 61, as shown. The flange 65 is cut away, as shown at 66, for a little more than a semicircumference, so as to leave the shoulders 67. Secured to the end of the end of the casting 57 adjacent to the flange 65, and by means of the screw 68 is the stop piece, said stop piece being provided with an overhanging end 70 which overlaps the flange 65. The main body of this stop piece 69 lies in the path of the shoulders 67, so that the tube 61 may be rotated through an angle of about 180 degrees, and when in one of its positions as for example, that shown in Fig. 6, the opening 64 will be in registry with the passage 59 and the inner passage of the tube 55. Extending into the opposite end of the tube 61 and through the apertured overhanging end of the casting 57 is the conveyer tube 71. This tube 71 forms a fairly close fit in the interior of the tube 61, so that while detachable, the oscillation of the tube 71 will cause a consequent oscillation of the tube 61 with the stop shoulders limiting the degree of such rotation. The outer end of the tube 71 beyond the overhang 60 is curved around through an angle of about 90 degrees and its outer end is slotted and pinched together slightly so as to form a gripping engagement with the connecting thimble of the sound box hereinafter to be described.

Figure 2:
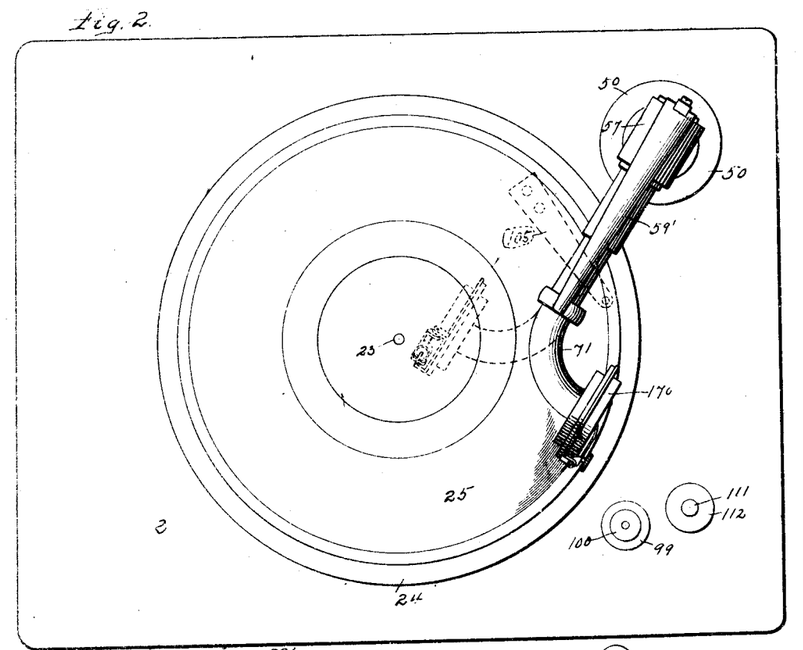
Fig. 2 is a plan view of the same.
Figure 3:
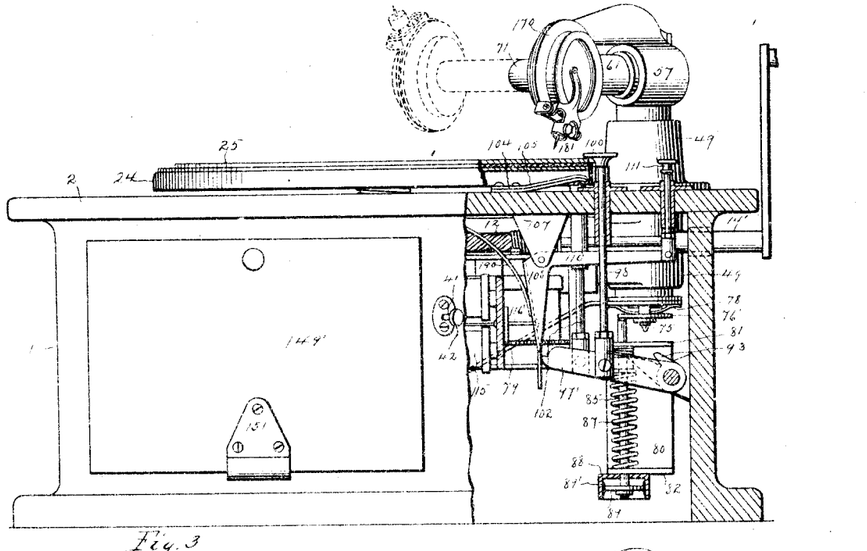
Fig. 3 is a view similar to Fig. 1 with the left hand end of the case broken away to expose a part of the automatic mechanism in the interior of the case, and showing the sound box and conveyer in elevated position.
Figure 4:
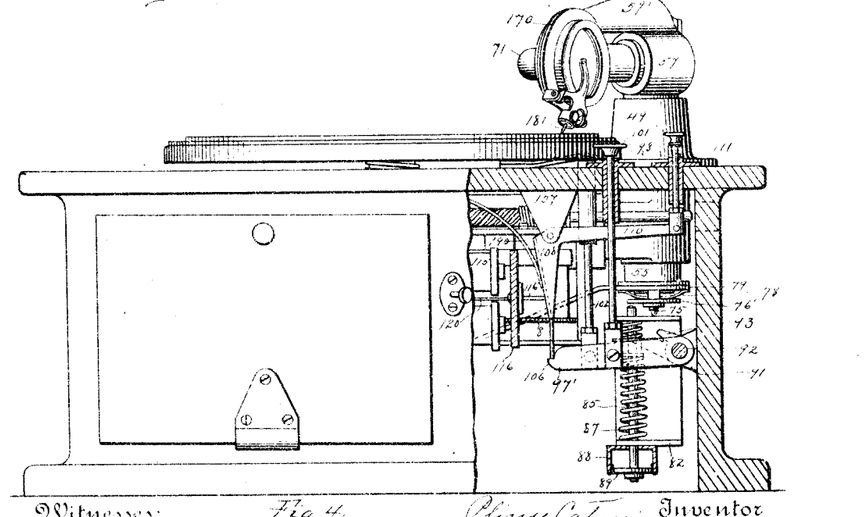
Fig. 4 is a view similar to Fig. 3, but with the sound box in a position occupied during the completing of a record.

From an inspection of Fig. 2 of the drawings, it will be now observed that the sound box and the curved end of the conveyer tube 71 are in a position for the sound box stylus to bear upon the surface of the record and that the degree of pressure with which the stylus bears upon the record depends upon the weight of the sound box and the curved end of the conveyer tube 71. With the sound box stylus bearing upon the surface of the record and said record rotating upon the table 24 through the influence of the motor heretofore described, it will be readily understood that the sound vibrations recorded upon the record will be conveyed through the tube 71, thence through the tube 61 to the passage 64, thence through the lateral opening 56 and out through the lateral opening 52 of the tubular standard 49, and thence outward through the horn 53 to the opening 54. This structure as thus far described reduces very materially the number of turns or bends in the sound conveyer between the sound box and the point of exit for the sound. This is a very important feature for the reason that with each turn or bend around which the sound must travel, its volume will be correspondingly diminished and the fewer number of bends or turns which the sound is constrained to make will result in correspondingly increased volume.

The lower end of the tube 55 is closed by means of the plug 72 which, upon the interior of the tube, is curved, as at 73 to form an easy turn for the sound vibrations and to direct them to the lateral opening 56. As thus far described and shown, the casting 57 might easily rest upon the upper end of the tubular standard 49, but in this form of my phonograph, it is not the intention for the casting 57, and the parts attached thereto, to be supported directly by the standard 49 although guided thereby through the medium of the tube 55. Into the lower end of the tube 55 is further fitted a flanged plug 73' centrally apertured and screw threaded as at 74 carrying in said screw aperture a bearing pin 75. Upon the outer portion of the pin 75 is screwed a flanged nut 76 between the flange of which and the flange 77 of the plug 73 are located, first, a washer 76', next a star spring wheel 78, and finally the stop arm conductor 79, the latter being in frictional engagement with the flange 77 and the star spring 78. This structure is such that the arm 79 may be rotated independently of the plug 73, but the frictional engagement is such that under normal strains, the swinging or oscillation of the plug 73 will carry with it the arm 79.

Figure 1:
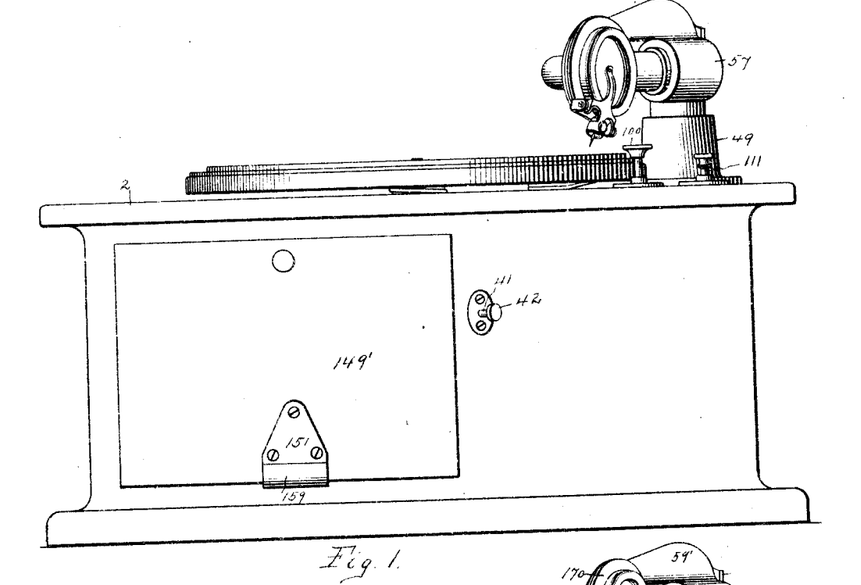
Figure 1 is a front elevation of my improved phonograph showing the sound box and conveyer in elevated position.
Figure 7:
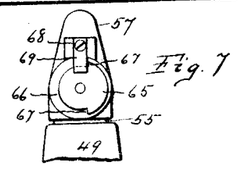
Fig. 7 is an end elevation of the sound conveyer showing the stops for limiting the position of the sound box when the same is either in the position for playing o a reversed position for the readjustment of the stylus needle.
Figure 8:
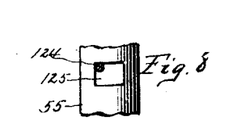
Fig. 8 is a side elevation of a short portion of the telescoping conveyer tube showing the limiting set screw.

As a means for stopping and starting the motor by hand, I provide the following mechanism: Referring to Fig. 5 it will be noted that on the inside of the case secured at the right hand end of the rear side of the case is the bracket 80 provided with the rectangular arms 81 and 82 projecting toward the interior of the case. These arms are apertured as at 83 and 84 for the reception of the vertically sliding pin 85, said pin being in position to engage the washer 76', which as hitherto described, is located upon the pivot pin 75 at the lower end of the tube 55. The bracket 80 with its upper arm 81 is located in position so that the pin 75 with its bearing point may rest upon the upper face of the arm 81, which serves as a bearing support for the entire vertically sliding conductor tube, and its parts which are contained in the tubular standard 49. Secured to the pin 85 near its upper end and beneath the arm 81 is the collar 86 between which and the lower arm 82 of the bracket 80 is located the compression spring 87. The tendency of this spring 87 is to elevate the pin 85, which, it will be observed, bears upon the under side of the washer 76′ and when unconstrained will serve to elevate the telescoping sound conductor tube and its parts and elevate the bearing pin free from the upper face of the outwardly projecting arm 81, so that the conductor tube and its parts under such circumstances are really supported by the compression spring 87. In this condition, it will be noted upon reference to Fig. 1, that the sound conductor tube together with the sound box will be raised free from the record. Beneath the arm 82 and surrounding the lower end of the pin 85 is the dash pot 88 within which and secured to the lower end of the pin 85 is the piston dash 89 and cup leather 89′. This dash pot serves to prevent the too vigorous action of the spring 87 in elevating the telescoping sound conveyer when the restraining mechanism for the spring is tripped or released. Under the circumstances of elevating the sound conveyer and sound box as described, it will be noted, that the stop shoulders 67 hitherto referred to and shown in Fig. 7, will prevent the stylus needle of the sound box from remaining in contact with the record, when the sound conveyer and its parts are elevated by the spring 87 as just described.

As a means for compressing the spring 87 and as a consequence, depressing the pin 85, I provide the following mechanism: Upon the interior of the case at the end wall thereof, adjacent to the bracket 80, I locate a pair of bearing brackets 90 and 91, which serve as bearings for the rock shaft 92. Mounted upon this rock shaft are various instrumentalities, hereinafter more particularly described. For the present, however, I will confine the description to the mechanism for compressing the spring 87 and depressing the pin 85. Rigidly mounted upon the rock shaft 92 adjacent to the pin 85, I locate the arm 93. Loosely mounted upon the shaft 92 is the arm 94 which latter consists of a piece of sheet metal blanked to shape, and having the apertured supporting lugs 95 through which the shaft 92 passes. As illustrated in the drawings, the arm 93 is located between the two supporting lugs 95. This arm also has the forwardly projecting flat portion 96 slotted at the end as at 97. This flat portion extends rearwardly or toward the shaft 92 to a distance to bring its rear end in position for engagement with the arm 93. The slot 97 in the forward end of the flat part 96 is for the purpose of permitting the upper end of the pin 85 to pass therethrough with the flat portion 96 resting upon the collar 86. The normal position of the shaft 92 is such that the arm 93 is out of contact with the flat part 96, but said flat part in any position will rest by its own weight upon the upper side of the collar 86. At the front end of the shaft 92 is the forwardly projecting arm 97′ rigidly connected to the shaft, as shown and from this arm 97′ the push pin 98 extends upwardly through the guide sleeve 99 and terminates in the push pin button 100 upon the exterior cover of the case. Upon the middle of the shaft 92 is a similar arm 101 from which extends upwardly, the brake pin 102 through a guide thimble 103 to the upper side of the cover in position to engage the under side of a brake spring 104, the latter being secured to the upper face of the cover 2 in position to engage the lower face of the rotating table 24. In order that the frictional engagement of the brake spring 104 may be more effective, I provide a brake leather 105 upon the upper face of the brake spring. The forward end of the arm 97′ is provided with a notched shoulder 106. Suspended from the under side of the cover by means of the bracket 107, is the bell crank lever 108, said bell crank having one of its arms as 109 extending down into position for engagement with the notched shoulder 106, when the arm 101 is depressed; the other arm 110 of the bell crank extends horizontally beneath the cover in position for engagement with the vertical push pin 111, the latter extending through the cover by way of a guide sleeve 112. Surrounding the shaft 92 near its forward end is a spring 113, one end of which is connected with the arm 97′ and the opposite end after having made several turns around the shaft 92 bears upon the inner side of the case. The tendency of this spring is to rotate the shaft in the direction of the arrow 114.

I will now proceed to describe the operation of the starting and stopping mechanism: Let it first be understood that the motor spring has been wound up and that the control rod 42 has been unscrewed to a distance to permit the governor to rotate freely. In the position of the parts just before starting, the lower end of the arm 109 of the bell crank 108 will be disengaged from the notch 106, the spring 113 will now have rotated the shaft 92 in position to elevate the rod 102 against the brake spring 104, which in turn bears upon the under side of the rotating table 24. The friction offered by this brake spring against the table 24, will sufficient to hold the table 24 and consequently stop the motor. If now, the push pin be depressed through the push button 100 the shaft 92 will be rotated to a position to permit the lower end 109 of the bell crank 108 to engage the notch 106. This will carry with it the brake rod 102 and thus permit the spring 104 to fall away from the under side of the table 24. During this rotation of the shaft 92, the arm 93 which up to this time has been entirely free from the flat portion 96 of the lever 94 will now contact with said portion and cause said lever to compress the spring 85 when the push pin 98 has been depressed a sufficient distance to cause the engagement of the bell crank lever arm 109 to engage the notch 106. The spring 85 will have been simultaneously depressed to permit the lowering of the telescoping conductor tube 55. This will permit the stylus of the sound box to bear upon the record and inasmuch as the turn table is free to rotate, the record will be duly rendered. Whenever it is desired to stop the motor it is only necessary to press the push pin 111 which bears upon the horizontal arm 110 of the bell crank and such depression will cause a disengagement of the vertical arm 109 of the bell crank from the notch 106. The shaft 92 now being released the spring 87 will be brought into action and through the lever 94 bearing upon the arm 93 will cause a rotation of the shaft 92, which rotation will serve to elevate the push pin 102 against the under surface of the brake spring 104, and this in turn will bear upon the under side of the rotating table 24 and consequently stop the motor. Simultaneously with the action of the spring 87, the pin 85 is elevated against the washer 76' resulting in the elevation of the tube 55, as shown in Fig. 5. This elevation will carry with it the sound box with its stylus free from the record, the sequence of operation being due to the making the arm 93 rigid upon the shaft 92, and the arm 94 loose upon the shaft and is as follows: During the depression of the push pin 98 the first portion of such depression will be occupied in carrying the brake pin 102 downwardly so as to relieve the brake spring from engagement with the table 24. Immediately upon such release the motor will set the turn table in motion. Further depression of the push pin 98 will cause the arm 93 to engage the loose arm 94 carrying the latter with it, and thereby depressing the pin 85 to permit the lowering of the pivot bearing 75, upon the upper face of the bracket arm 81. This lowering of the pivot pin is completed by the lowering of the telescoping sound conveyer tube 55, and with it the sound box with its stylus upon the record. It will thus be seen that with this sequence of operation, the turn table 24 will acquire a considerable rotative speed before the sound box stylus shall have contacted with the surface of the record. A depression of the pin 111 will simply reverse the sequence of operation, that is to say, the pin 85 will be elevated so as to lift the sound box stylus by means of the conveyer tube free from the record before the rotating table 24 shall have ceased to rotate through the contact of the brake spring 104 therewith.

I will now proceed to describe the automatic action of the device whereby, upon the completion of the rendition of a selection the motor is automatically stopped and the sound box elevated, so as to brake the contact of the stylus with the face of the record. Located adjacent to the lever 108 is a magnet 115 with its armature 116. This armature is connected by a link 116' with the vertical arm of the lever 108. At 117 I locate a pair of dry battery cells connecting the same in parallel with the coils of the magnet, leading the connections from the magnet to any metallic part of the structure, as for example, to the shaft 92. The other circuit wire leads to a contact piece 118, the latter being located in the path of the arm 79 which, it will be remembered, is located in frictional engagement with the parts connected to the lower end of the tube 55. The electric circuit is complete from the batteries to the electro-magnet, thence to the shaft 92, thence through the lever 94, pin 85 to the pivot pin 75 when the same is resting upon the bracket arm 81. From the pivot pin 75 the metallic circuit passes to the arm 79 and when the outer end of said arm is in contact with the contact piece 118, the circuit will be completed. As a means for limiting the throw of the armature 116, I provide an extension 119 upon said armature and connect the same by means of a link 120 with a projecting arm 121 of the magnet supporting bracket 122. This connecting link is provided with an adjusting nut 123 outside of the projecting part of the bracket, so that the throw of the armature may be adjusted to keep within the field of the magnet.

In operation the parts may be so set that when the playing of a record has been completed, the circuit through the magnet 115 will be established, thereby tripping the lever arm 101, resulting in the stopping of the motor and the elevating of the sound box with its stylus free from the record. This is accomplished in the following manner: The arm 59 is first swung to the right as the same would appear in Fig. 2 to the limit permitted by the set screw 124, which passes through the lower end of the tubular standard 49 and extends into the slot 125 provided in the tube 55. This slot is of dimensions to permit the vertical play of the tube 59 and also the lateral play of the same to the limits described for the arm 57. This will carry the arm 79 through its frictional engagement with the parts at the end of the tube 55, until it contacts with some stationary part of the mechanism. If now, the arm 59 is swung in the opposite direction the arm 79 will contact with the contact piece 118 before the stylus of the sound box has come to the inner circle of the sound record. This will be the point where, when the pivot 75 has established circuit by resting upon the upper face of the plate 81, will form a complete circuit through the magnet 115. The arm 59 may now be swung back to the beginning of the record and the push pin 100 depressed to set the motor in operation as hitherto described. When the stylus of the sound box has traversed the complete record, the arm 79 will have just reached the contact piece 118, and inasmuch as the circuit is otherwise complete this contact will establish circuit through the magnet thus attracting the armature 115 thereby tripping the vertical arm of the bell crank 109, consequently releasing the spring 87 to elevate the sound conveyer through the pin 85.

Figure 12:
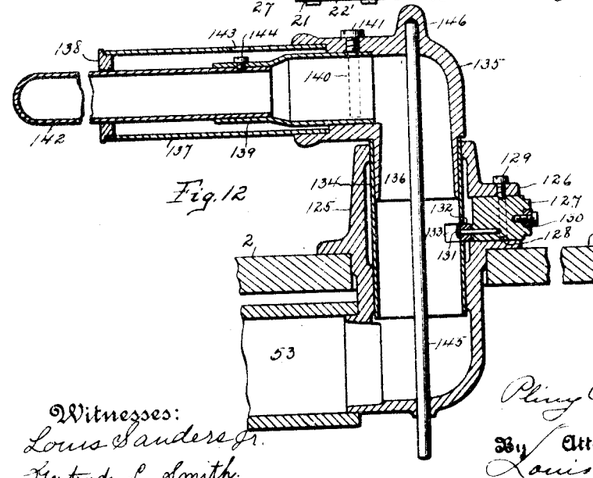
Fig. 12 is a longitudinal section and a modification of the sound conveyer showing the means employed for elevating the same. The elevating device of this modification contemplates the omission of the automatic elevating device as illustrated in the other figures.
Figure 13:
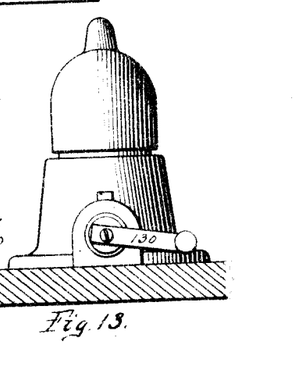
Fig. 13 is an end view of the modification illustrated in Fig. 12 showing the hand lever for elevating the sound box and telescoping sound conveyer by hand.

In Figs. 12 and 13, I have shown modifications of the sound conveyer such as may be used in cheaper grades of instruments than the one just described. In this case more particularly is it adapted for the instrument in which the electric stop mechanism has been omitted. It is however adapted for use where hand elevating of the sound conveyer and sound box do not appear to be objectionable. In this structure I use substantially the same form of tubular standard 125, as heretofore described, supported upon the cover 2 and projecting through an aperture 51. Upon the rear side of the casting 125 is a laterally extending apertured boss 126 in which is located the cylindrical stub shaft 127. A circumferential groove 128 is provided in the shaft to receive a screw 129, which when in position prevents the displacement of the stub shaft 127, yet permits the free rotation thereof. Upon the outer end of the stub shaft 127 I provide a crank 130 by which it may be rotated through an angle of a little more than 180 degrees, being limited by the contact of the crank or handle 130 with the upper face of the box or case cover 2. Projecting from the inner end of the shaft 127 is the eccentrically located bearing pin 131 which carries the antifriction roller 132. The bearing pin 131 and friction roller 132 are in position to engage the edges of a slot 133 in the side of the telescoping tube 134. From the structure as thus described, it will be readily seen that the swinging of the crank or handle 130 from one side to the other will operate the eccentrically located roller 132 in the slot 133 to raise and lower the tube 134.

Figure 6:
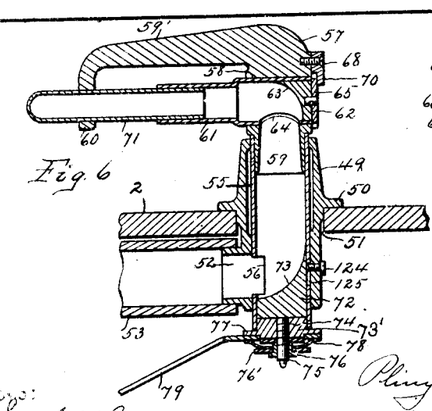
Fig. 6 is a vertical section of the sound conveyer showing the details of the mechanism and the various bearings connected therewith.

I may use for the remainder of the sound conveyer the structure as illustrated in Fig. 6, if desired, or I may substitute for the casting 57 the plain elbow casting 135 with its lower end 136 rigidly secured in the upper end of the telescoping tube 134 as by brazing or soldering. Extending from the lateral arm of the elbow 135 is the tube 137 provided at its forward end with an apertured guide or support plug 138. Within this tube 137 and rotatably secured in the elbow 135 is a short section of tube 139 slotted as at 140 for about one half of its circumference to receive the limiting screw 141 whereby the rotation of the section of the tube 139 upon its axis may be limited to about 180 degrees. Extending through the apertured plug 138 and into the free end of the section 139 is the curved sound box tube 142 similar in all respects to the tube 71, as illustrated in Figs. 2 and 6. I provide a lateral aperture 143 in the tube 137 so that access may be had to the screw 144 which rigidly connects the tube 142 with the tube 139.

As a means for supporting the telescoping sound conveyer structure as just described, I provide the supporting bearing pin 145, extending the same axially through the tube 134 down through the turn in the tubular standard 125, as clearly illustrated in the figure with the lower end of said bearing pin 145 located in position to be supported by a bracket similar in all respects to the bracket 81. The upper end of the pivot pin 145 projects into an offset bearing 146, at the upper turn of the elbow 135 so that the telescoping part of the second conveyer, as described, is practically supported upon its bearing pin 145 and is guided in its oscillation by the tubular standard 125. As above indicated the elevation of the telescoping parts thus described through the medium of the stub shaft 127 will operate to elevate the sound box and its needle clear of the phonograph record in substantially the same manner as described in connection with the automatic electrical stop and elevating mechanism. It is to be understood that the amplifying conveyer 53 is to be connected to the lower end of the tubular standard 125 in substantially the same manner as the amplifying conveyer hitherto described, is connected to the standard 49.

Figures 16, 17, 18:
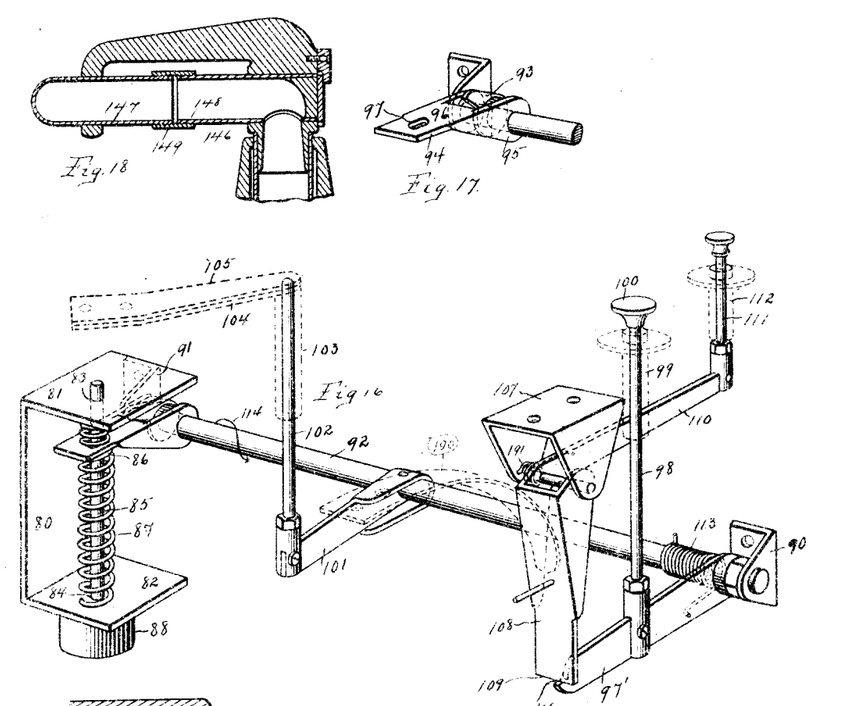

As a slightly further modified form of the sound conveyer tube I may provide the structure as illustrated in Fig. 18. In this case the only difference in the structure of the modification over that as illustrated in Fig. 6 resides in the sectional sound conveyer tube 146 which is uniform in diameter throughout its length, but made sectional with the parts 147 and 148 connected together by a union 149. The outer end of the section 147 is curved in the same manner as the conveyer tube 71 is curved as illustrated in Fig. 2. It may be stated here that the purpose of making this conveyer tube in section rather than as a single piece is solely for convenience in assembling. With the curved end of the tubular conveyer at the one end and the plug structure at the opposite end it is found inconvenient as a manufacturing proposition to assemble the parts and therefore they are made in the various forms as above described and illustrated in the several figures of the drawings which illustrate actual structural forms rather than preferred and modified forms.

Figure 19:
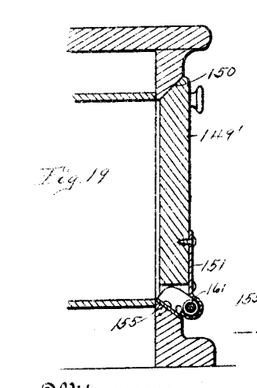
Fig. 19 is a sectional view through the spring hinge structure for the amplifying part of the phonograph.
Figures 20, 21, 22:
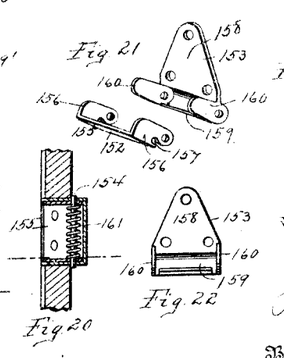
Fig. 20 is a horizontal sectional view of the hinge through its axis.
Fig. 21 illustrates the parts of the hinge structure separated to show their details.
Fig. 22 is a rear view of the door section of the hinge.
Figures 23, 24:
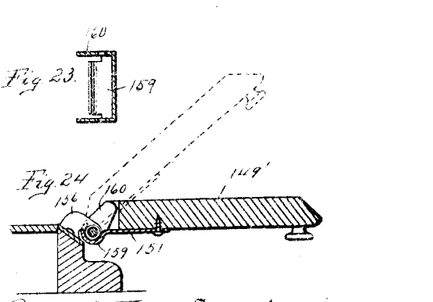
Fig. 23 is a sectional view of one of the hinge members.
Fig. 24 is a sectional view similar to Fig. 19 showing the limiting position of the door and its various adjustment.

In Figs. 19 and 24 I have shown a form of closure for the sound amplifying conveyer 54. This consists in a trap door 149' hinged at the bottom by a special form of hinge which permits the door to be swung open to the limit illustrated in Fig. 24 or partially closed and held in any angular position between the two positions as illustrated in Figs. 19 and 24. It will be noted that the door opening is flared out as at 150 all the way around and the door 149' is constructed to closely fit this flared out opening. The hinge 151 for the door is provided at the bottom and is of special structure which I will now proceed to describe. It consists of the two sections 152 and 153 pivoted together by means of a pivot pin 154 and respectively connected to the lower edge of the opening 150 and to the door 149'. The section 152 consists of the bottom portion 155 and the lateral apertured cheek pieces 156. The apertured ends of these cheek pieces extend over somewhat so as to provide for the open ended slots 157. The section 153 comprises the flat fastening element 158 and the cylindrical protecting section 159 with the lateral apertured cheek pieces 160. These cheek pieces extend forward as shown so that when in position they lie against the outer sides of the cheek pieces 156 of the other section. The pin 154 passes through the registering apertures in the cheek pieces 156 and 160, with a spring 161 located thereon, said spring being considerably compressed so as to bear upon the inner faces of the cheek pieces 156. The section 152 being made of spring metal the effect of the spring 161 upon the cheek pieces 156 is to press them outwardly into closer frictional engagement with the inner face of the cheek pieces 160, so that the structure constitutes a friction hinge of such a nature that the door 149 may be adjusted to any position from closed to widely open with the result that any degree of amplitude of sound may be emitted from the sound amplifier within the limits of the instrument.

Figures 14, 15:
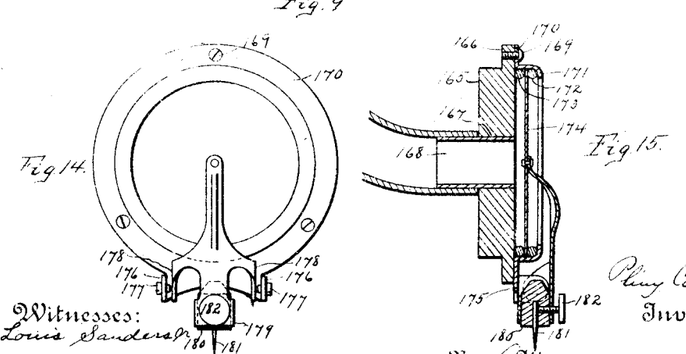
Fig. 14 is a front elevation of the sound box showing the details of the stylus lever.
Fig. 15 is a vertical sectional view of the same.

I have shown in Figs. 14 and 15, the sound box designated for use in connection with the phonograph as described. This sound box forms the subject matter of another application, but is described here merely for the purpose of giving a better understanding of the parts. This sound box consists of a circular plate as 165 having the circular flange 166 and the central aperture 167. Into this aperture is rigidly inserted the connecting tubular thimble 168 which connects the sound box proper with the curved end of the conveyer tube 71. Secured to the face of the plate 165 by means of the screws 169 is the flanged clamping ring 170 having a cut away center so as to provide the inwardly projecting flange 171 which serves to hold the two gaskets 172 and 173 in place, with the diaphragm 174 therebetween. The clamping ring 170 is provided with a lateral projection 175 which latter has the outwardly projecting apertured lugs 176 for carrying the stylus holder pivots 177. The stylus holder consists of a piece of sheet metal blanked to shape and provided with means for connection with the center of the diaphragm and lateral spring lugs 178 which bear against the inner points of the pivot pins 177. A tubular extension 179 carries the stylus socket 180 into which is inserted the stylus needle 181, the same to be held in position by means of the set screw 182.

I have shown in the various figures, a spring 190 located on the under side of the cover 2 and bearing upon the bell crank stop lever for normally giving said lever a bias to hold the starting pin in its elevated position, and also to hold the lower end of said bell crank 108 in position to snap into engagement with the notch in the arm 97'. This is to be used in addition to the spring 191 which is mounted upon the pivot of said lever, if desired.

Figure 25:
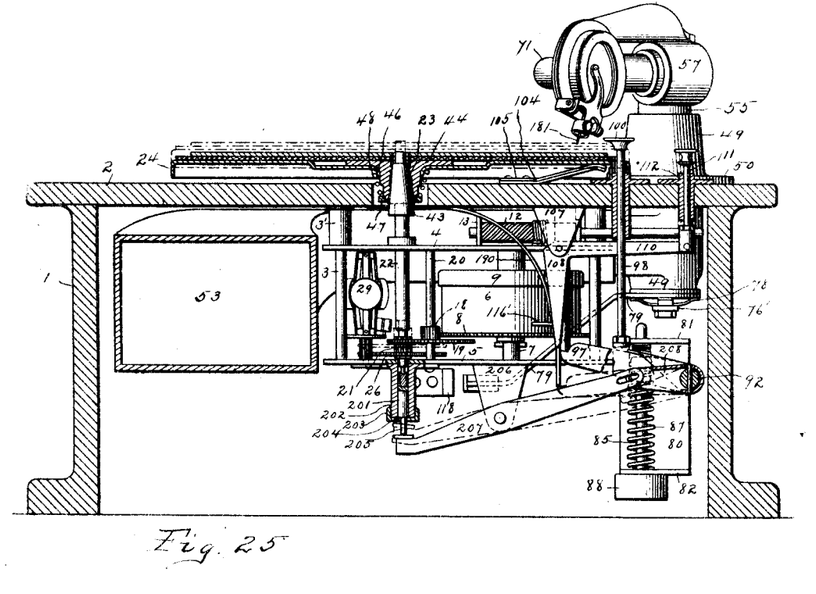
Fig. 25 is a side elevation of the mechanism within the case showing the structure whereby the record support may be raised and lowered, the general features of the structure being the same as illustrated in the preceding figures.
Figure 26:
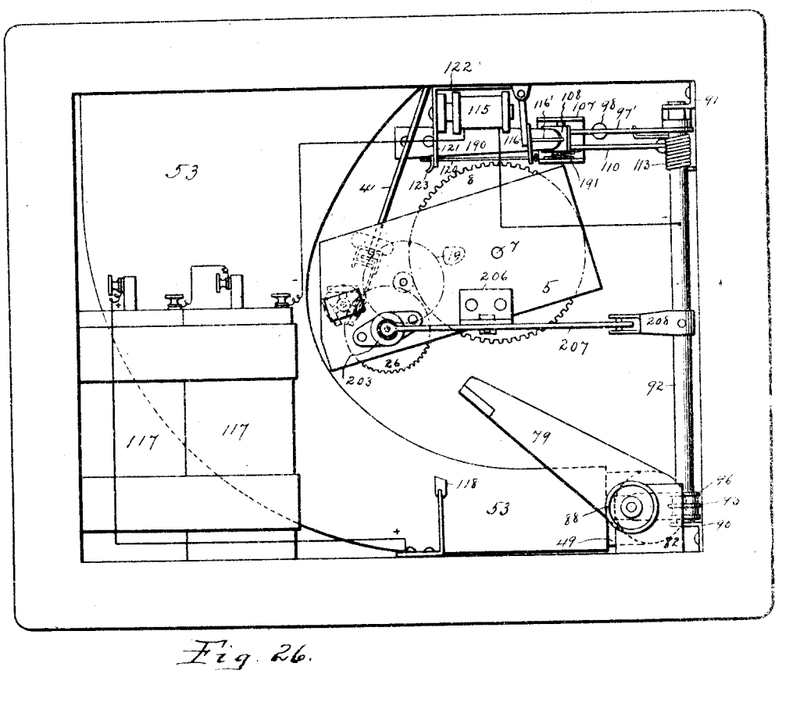
Fig. 26 is a bottom plan view of the structure shown in Fig. 5.

In Figs. 25 and 26 I have shown a form of my invention whereby the sound box and conveyer tube swings in a fixed horizontal plane, parallel to the plane of the record supporting table 24 with means for raising and lowering said table into and out of contact with the stylus or reproducing needle 181. The general features of this latter structure are identical with those illustrated in the preceding figures with however, such changes made as are necessary to raise and lower the record support. In this form, inasmuch as the sound box is to swing in a fixed horizontal plane, it is unnecessary to provide means for raising and lowering the tube 55. The casting 57 is such that it may rest and swing upon the tubular standard 49 substantially as illustrated in Fig. 6. The lower end of the tube 55 projects below the lower end of the tubular standard 49 and carries upon it the frictional swing arm 79 for contact with the contact strip 118. This arm however, is somewhat shorter than that illustrated in Fig. 9, so that it may clear all of the parts which might otherwise interfere with its free movement. The contact piece 118 is also moved forwardly toward the center of rotation of the arm so as to bring it within the sweep of said arm in order to establish the circuit heretofore referred to. In order to provide for the raising and lowering of the record support, I make the supporting shaft 22 vertically slidable in the upper and lower motor plates 4 and 5, with the pinion 21 mounted upon said shaft of a much wider face to provide for the range of movement of the shaft. The table driving shaft 22 is supported by means of a vertically sliding plug 201 carried in a socket 202, mounted in axial alinement with the shaft upon the under side of the plate 5. This socket is provided with a screw threaded cap 203 having an aperture 204 smaller than the central aperture of the socket, and the plug is shouldered and provided with a reduced external portion 205 extending through the aperture 204 in the cap. On the under side of the plate 5, I secure a bracket 206 which has a vertical arm for supporting the shifting lever 207. This lever has one of its arms projecting forwardly with its extremity just below the reduced portion 205 of the plug 201, and the other arm extending on the other side of its pivot to form a kind of toggle connection with the arm 208 secured to the rock shaft 92. The remaining mechanism is substantially the same as illustrated in the other figures and need not be further described. The operation of this structure is as follows: The depression of the starting button or push pin 100 will oscillate the rock shaft 92 and thus tilt the lever 207 to raise the plug 201 and with it the record supporting shaft 22, so as to raise the record up for engagement with the stylus needle 181 of the sound box and away from the brake 104, 105, the sequence of operation being such that the brake is first left behind by the record support, and next the surface of the record itself will come in contact with the point of the stylus needle. The record support 24 under these circumstances will carry the record into contact with the stylus needle and being free from the brake underneath, it will rotate under the impulse of the motor spring. It is to be understood in this connection that the bell crank 108 with its vertical arm will engage the stop arm 97' mounted upon the rock shaft 92 and thus hold the parts in position until the stylus needle shall have accomplished the limit of its travel, when of course electrical contact will be made by the arm 79 with the contact piece 118, and the circuit being established, the vertical arm of the bell crank lever 108 will be drawn away by the magnet through the link 116', when the spring 87 will oscillate the rock shaft and in turn, oscillate the shifting lever, and the record support with its shaft will fall by gravity, so as to break contact between the record upon the support with the needle. I regard this latter form as a very valuable form which the invention may take and therefore desire to cover the same broadly along with the form described in the earlier part of this specification.

I claim,

1. In a phonograph, a sound box, a record support, means for separating said sound box from said record support, comprising a sound conveyer tube having telescoping sections, and automatic mechanism for positively sliding one of said sections axially within another section thereof at any predetermined point in the playing of a record.

2. In a phonograph, a sound box and a sectional sound conveyer tube, and automatic means for telescoping one section of said tube into another section thereof to separate the sound box from the record being played at any predetermined point in the playing thereof.

3. In a phonograph a metallic sound conveyer tube, a support for said tube in which it may oscillate upon its axis, a plug in the end of said tube, said plug being provided with a shouldered flange, and a lug upon said support, said lug having a stop thereon for coöperation with the shoulders of said flange and an overhanging projection for retaining said tube in said support.

4. In a phonograph, a sound conveyer tube, a support in which said tube may oscillate upon its axis, a sound directing plug inserted in the end of said tube, a flange upon said plug, said flange being provided with a pair of substantially diametrically located shoulders, and a lug secured to said support and overhanging said flange for coöperating with said shoulders to limit the oscillation of said tube and for preventing the accidental displacement of said tube from said support.

5. In a phonograph, a record tablet support, a rotatable shaft upon which said support is mounted, a bearing flexibly secured to said support and means for rigidly but detachably securing said bearing to said shaft.

6. In a phonograph, a disk record tablet support having a central aperture therein, and a center bearing flexibly secured to the center of said support and projecting through said aperture.

7. In a phonograph a detachable disk record tablet support having a central aperture therein, and a flanged center bearing projecting through said aperture and flexibly secured to said support from the lower face thereof.

8. In a phonograph, a detachable record tablet support having an aperture in the center thereof, a center bearing projecting through said aperture and a laterally yielding spring permanently connecting said bearing to said support.

9. In a phonograph, a detachable record tablet support having a central aperture therein, a flange upon said support surrounding said aperture, and a centrally apertured center bearing permanently yet flexibly secured to said support in the central aperture thereof.

10. In a phonograph, a sound box, and a stylus needle therefor, a record tablet support, a motor for rotating said support when said stylus needle bears upon a record carried by said support, electrically released spring actuated mechanism for separating said record and support from said needle, and stop mechanism actuated by the release of said spring mechanism for stopping the rotation of said record tablet support.

11. In a phonograph a sound conveyer, a sound box secured to and in communication with said conveyer, a needle secured to said sound box, a rotatable disk record support, a motor for rotating said support, electrically released spring actuated mechanism for raising said sound box and its needle out of contact with a sound record carried upon said support, and a stop mechanism actuated by said spring mechanism for stopping said motor, said electrically released spring mechanism being actuated by a pre-determined travel of said sound box and its needle across a record upon said support.

12. In a phonograph, a sound box and its stylus needle, a sectional telescoping sound conveyer tube and electrically released spring operated means for extending said tube to separate the sound box and its stylus needle from the record being played at a predetermined point in the playing thereof.

13. In a phonograph, the combination of a sound box and its stylus needle with a sectional extensible sound conveyer tube, means for contracting said tube to cause the stylus needle to bear upon the record to be played, and electrically released spring operated means for extending said tube to cause said stylus needle to be raised free from the record at a predetermined point in the playing thereof.

14. In a phonograph, a sound conveyer tube of uniform diameter pivotally mounted to oscillate upon its own axis, the free end of said tube being bent substantially into a quadrant, a swinging support for said tube, a shouldered plug in the other end of said tube, a stop upon said support for coöperation with said shouldered plug to limit the oscillation of said tube and means for connecting a sound box to the bent extremity of said tube.

15. In a phonograph, a record support consisting of a rotating disk or table, a tubular oscillating sound conveying arm capable of limited free movement in a plane parallel to the plane of said record support, electrically released spring operated means governed by the movement of said arm for relatively moving said sound conveying arm and said support away from each other, and a sound box with a stylus needle secured to said arm for coöperation with a sound record carried by said support.

16. In a phonograph, a metallic sound conveyer tube, a swinging supporting arm through which said tube projects and in which it may oscillate upon its axis, the free end of said tube being bent upon a quadrant curve, a sound directing plug having a shouldered flange thereon inserted into the opposite end of said tube and a lug upon said supporting arm for coöperating with the shoulders of said flange for limiting the oscillation of said tube to a predetermined degree of angularity.

17. In a phonograph, a record support, a cylindrical metallic sound conveyer tube, a swinging supporting arm in which said tube may both oscillate upon its axis and with which it may swing in a plane parallel to the plane of said record support, a sound directing plug having a flange thereon, provided with shoulders, said plug being inserted into said tube and a lug upon the end of said supporting arm for coöperating with the shoulders upon said flanged plug to limit the axial oscillatory movement of said tube.

18. In a phonograph, a rotating disk record support, a sound conveyer tube pivotally mounted to oscillate in a plane parallel to said record support, and electrically released spring operated means upon said phonograph for shifting the plane of oscillation of said sound conveyer tube.

19. In a phonograph, a sound conveyer tube, a supporting standard in which sound conveyer tube may vertically slide, and horizontally oscillate and an electrically released spring actuated means for vertically sliding said sound conveyer tube within said standard.

20. In a phonograph, a sound conveyer consisting of a pair of tubular sections connected together at right angles to each other, a tubular standard in which one of said sections is mounted to slide vertically and rotate horizontally upon its axis and electrically released spring actuated mechanism for sliding said section within said tubular standard.

21. A sound conveyer tube for phonographs comprising two tubular sections connected together with their axes at right angles to each other, a tubular standard in which one of said sections is mounted for limited oscillation upon its own axis, and electrically released spring operated means for reciprocating said last named section within said tubular standard in the direction of its axis upon a predetermined degree of oscillation thereof.

22. In a phonograph, the combination with a rotating drive shaft having a bearing support thereon, with a sleeve for frictional engagement with said bearing support, and a record supporting disk resiliently connected to said sleeve.

23. In a phonograph, the combination of a record driving shaft having a bearing support thereon, a bearing sleeve having a conical bore for frictional engagement with said bearing support, and a record tablet support flexibly connected to said bearing sleeve.

24. In a phonograph, the combination of a vertical driving shaft, a conical bearing support upon the free end of said shaft, a sleeve having a conical bore therethrough for frictional engagement with said conical bearing support, a flange upon one end of said sleeve and a collar screw threaded upon the opposite end of said sleeve, and a record tablet support resiliently mounted upon said sleeve between said flange and said collar.

25. In a phonograph, the combination of a vertically disposed driving shaft, a conical bearing support upon the upper end of said driving shaft, a bearing sleeve having a conical bore therethrough designed for frictional engagement with said conical bearing support, a flange upon one end of said sleeve, and a collar screw threaded upon the other end of said sleeve, a record supporting disk and a spring between said collar and said flange for resiliently holding said supporting disk against said flange.

26. A record tablet supporting disk for phonographs, comprising a centrally apertured tablet supporting disk, and a bearing sleeve flexibly mounted in the aperture of said disk.

27. A rotating table or tablet supporting disk for phonographs, comprising a centrally apertured disk, a flange surrounding said central aperture, a flanged bearing sleeve or thimble projecting through said aperture in frictional engagement with the flange thereof, and resilient means for holding said sleeve or thimble in flexible engagement with said tablet supporting disk.

28. In a phonograph, a record tablet supporting disk, means for rotating said disk in its own plane, a sound box, a sound conveyer tube supporting said box and capable of oscillation in a plane parallel to the face of said supporting disk, and electrically released spring operated stop mechanism governed by the oscillation of said sound conveyer tube for shifting the plane of oscillation of said sound conveyer tube, and thereafter stopping said rotating means.

29. In a phonograph, the combination of a record tablet supporting table, a spring motor for rotating said table, a sound box with a sound conveyer tube for supporting said box, said sound conveyer tube having a horizontal arm capable of oscillating in a plane parallel to the surface of said supporting table, said sound conveyer tube also having a vertical tubular portion, a tubular standard for supporting said conveyer tube and sound box, manually operated means for raising and lowering said sound conveyer tube in said tubular standard, and automatic means for causing a predetermined angularity of lateral oscillation of said conveyer tube to raise said conveyer tube and thereafter to stop said motor.

30. In a phonograph, a sound box, a record support, automatic means for separating said sound box from said record support, comprising a sound conveyer tube having a vertically sliding section, a spring for elevating said section, a detent for holding said spring under compression to lower said section, and electrically actuated means for releasing said detent to permit said spring to raise said section and said sound box from said record support.

31. In a phonograph, a horizontal sound conveyer tube, a tubular support in which said sound conveyer tube may oscillate upon its axis, a shouldered plug in one end of said sound conveyer tube and a lug upon said support for coöperation with said shouldered plug to limit the oscillations of said conveyer tube.

32. A talking-machine including in its construction a rotary spindle, a socket member fitted upon said spindle and having a flange, a record carrier loosely mounted upon said socket member below the flange, and a spring for pressing the record carrier against the said flange.

In testimony whereof I have hereunto set my hand this 23rd day of April, 1912.

PLINY CATUCCI.

Witnesses:
Louis M. Sanders,
W. B. Waltzinger.